(12) United States Patent
Hung

(10) Patent No.: US 11,750,105 B1
(45) Date of Patent: Sep. 5, 2023

(54) FULL-BRIDGE PHASE-SHIFT CONVERTER WITH VOLTAGE CLAMPING

(71) Applicant: ASIAN POWER DEVICES INC., Taoyuan (TW)

(72) Inventor: Tsung-Liang Hung, Taoyuan (TW)

(73) Assignee: ASIAN POWER DEVICES INC., Taoyuan (TW)

( * ) Notice: Subject to any disclaimer, the term of this patent is extended or adjusted under 35 U.S.C. 154(b) by 0 days.

(21) Appl. No.: 17/836,187

(22) Filed: Jun. 9, 2022

(30) Foreign Application Priority Data

Apr. 29, 2022 (TW) .................................. 111116377

(51) Int. Cl.
*H02M 3/335* (2006.01)
*H02M 1/00* (2006.01)

(52) U.S. Cl.
CPC ..... *H02M 3/33592* (2013.01); *H02M 1/0045* (2021.05); *H02M 3/33573* (2021.05)

(58) Field of Classification Search
CPC ........... H02M 3/33592; H02M 1/0045; H02M 3/33573
See application file for complete search history.

(56) References Cited

U.S. PATENT DOCUMENTS

| | | | | |
|---|---|---|---|---|
| 5,144,547 A | * | 9/1992 | Masamoto | H03K 17/691 363/20 |
| 5,907,479 A | * | 5/1999 | Leu | H02M 3/3353 363/21.08 |
| 9,407,136 B2 | * | 8/2016 | Hung | H02M 1/4225 |
| 10,833,604 B1 | * | 11/2020 | Chiu | H02M 3/33507 |
| 11,646,652 B1 | * | 5/2023 | Graves | H02M 3/33576 363/13 |
| 2002/0044459 A1 | * | 4/2002 | Tsubota | H02M 1/34 363/16 |
| 2006/0203521 A1 | * | 9/2006 | Tsuruya | H02M 3/33571 363/21.01 |
| 2007/0216390 A1 | * | 9/2007 | Wai | H02M 3/158 323/351 |
| 2010/0315839 A1 | * | 12/2010 | Yang | H02M 3/33576 363/17 |
| 2011/0133557 A1 | * | 6/2011 | Reilly | H02M 7/06 363/126 |
| 2013/0301304 A1 | * | 11/2013 | Murakami | H02M 3/33507 363/17 |
| 2014/0056032 A1 | * | 2/2014 | Pan | H02M 3/3372 363/16 |
| 2015/0097546 A1 | * | 4/2015 | Pan | H02M 3/158 323/311 |

(Continued)

*Primary Examiner* — Yusef A Ahmed
(74) *Attorney, Agent, or Firm* — Muncy, Geissler, Olds & Lowe, P.C.

(57) ABSTRACT

A full-bridge phase-shift converter with voltage clamping includes a transformer, a primary-side circuit, and a secondary-side circuit. The secondary-side circuit includes a first synchronous rectifying switch, a second synchronous rectifying switch, an output inductor, a plurality of diodes, a capacitor, an energy-releasing unit, and an output capacitor. The capacitor provides a clamping voltage. The energy-releasing unit is coupled to the capacitor in parallel, and converts the clamping voltage into an output voltage. The output capacitor is coupled to the energy-releasing unit in parallel, and provides the output voltage.

4 Claims, 6 Drawing Sheets

(56) References Cited

U.S. PATENT DOCUMENTS

| | | | |
|---|---|---|---|
| 2015/0381075 A1* | 12/2015 | Qu | H02M 3/33576 363/132 |
| 2016/0043631 A1* | 2/2016 | Hung | H02M 1/34 363/126 |
| 2018/0115247 A1* | 4/2018 | Schekulin | H02M 3/33584 |
| 2020/0304033 A1* | 9/2020 | Escudero Rodriguez | H02M 3/33523 |
| 2022/0399804 A1* | 12/2022 | Rehlaender | H02M 3/33592 |

* cited by examiner

FULL-BRIDGE PHASE-SHIFT CONVERTER WITH VOLTAGE CLAMPING

BACKGROUND

Technical Field

The present disclosure relates to a full-bridge phase-shift converter, and more particularly to full-bridge phase-shift converter with voltage clamping.

Description of Related Art

The statements in this section merely provide background information related to the present disclosure and do not necessarily constitute prior art.

Please refer to FIG. 1, which shows a circuit diagram of a full-bridge phase-shift converter in the related art. The full-bridge phase-shift converter is switched by a lagging bridge arm and a leading bridge arm formed by four power transistors. The lagging bridge arm includes a first switch $Q_1$ and a second switch $Q_2$. The leading bridge arm includes a third switch $Q_3$ and a fourth switch $Q_4$. Moreover, the first switch $Q_1$ and the fourth switch $Q_4$ work together to complete one half cycle (for example, the positive half cycle), and the second switch $Q_2$ and the third switch $Q_3$ complete the other half cycle (for example, the negative half cycle). As shown in FIG. 1, the secondary side of the transformer is a synchronous rectification structure, or alternatively a diode rectification structure.

Incidentally, each half-bridge arm, that is, the lagging bridge arm or the leading bridge arm is switched with 50% duty cycle (including the consideration of dead time), so the output voltage of the full-bridge phase-shift converter is controlled by the phase difference of the two half-bridge arms. Specifically, the first switch $Q_1$ and the second switch $Q_2$ of the lagging bridge arm are complementarily controlled, and the third switch $Q_3$ and the fourth switch $Q_4$ of the leading bridge arm are complementarily controlled.

For the architecture of the traditional full-bridge phase-shift converter shown in FIG. 1, due to the high output current, synchronous rectification is usually used on the secondary side of the transformer, such as a rectifier composed of a first synchronous rectifying switch $Q_{S1}$ and a second synchronous rectifying switch $Q_{S2}$. In particular, the first synchronous rectifying switch $Q_{S1}$ and the second synchronous rectifying switch $Q_{S2}$ independently operate. Usually, the switches ($Q_1$-$Q_4$) of the lagging bridge arm and the leading bridge arm operate at the switching frequency, and the first synchronous rectifying switch $Q_{S1}$ and the second synchronous rectifying switch $Q_{S2}$ operate at twice the switching frequency. Since the secondary-side inductances $N_{s1}$, $N_{s2}$ of the secondary-side winding Ws of the transformer have leakage inductances (i.e., secondary-side leakage inductances) $L_{LkS1}$, $L_{LkS2}$, when the first synchronous rectifying switch $Q_{S1}$ or the second synchronous rectifying switch $Q_{S2}$ is turned off, the leakage inductances $L_{LkS1}$, $L_{LkS2}$ and the parasitic capacitances of the first synchronous rectifying switch $Q_{S1}$ and the second synchronous rectifying switch $Q_{S2}$ will occur high-voltage oscillation to generate surge voltages, which are show in FIG. 2. In particular, the maximum voltage peak value of the switch voltage waveform may even exceed 180 volts, which exceeds the voltage rating of the component, thus generating a large amount of electromagnetic interference (EMI) noise.

In order to overcome the effects of surge voltages, components with higher voltage ratings may be used to withstand the generated surge voltages. However, the use of components with high voltage ratings will result in increased circuit costs. Furthermore, the heat generated during the operation of the components will accumulate inside the circuit, which not only reduces the power conversion efficiency, but also causes the problem of heat dissipation that needs to be overcome.

SUMMARY

An object of the present disclosure is to provide a full-bridge phase-shift converter with voltage clamping. The full-bridge phase-shift converter includes a transformer, a primary-side circuit, and a secondary-side circuit. The transformer includes a primary-side winding and a secondary-side winding. The primary-side circuit includes a first switch arm and a second switch arm. The second switch arm is coupled to the first switch arm in parallel. The secondary-side circuit includes a first synchronous rectifying switch, a second synchronous rectifying switch, an output inductor, a first diode, a second diode, a third diode, a capacitor, an energy-releasing unit, and an output capacitor. The first synchronous rectifying switch is coupled to a first end of the secondary-side winding. The second synchronous rectifying switch is coupled to a second end of the secondary-side winding. The output inductor is coupled to a center-tap end of the secondary-side winding. An anode of the first diode is coupled to the first end. An anode of the second diode is coupled to the second end. An anode of the third diode is coupled to the center-tap end, and a cathode of the first diode, a cathode of the second diode, and a cathode of the third diode are commonly coupled to a clamping node. The capacitor is coupled to the clamping node, and provides a clamping voltage. The energy-releasing unit is coupled to the capacitor in parallel, and converts the clamping voltage into an output voltage. The output capacitor is coupled to the energy-releasing unit in parallel, and provides the output voltage.

In one embodiment, the secondary-side winding includes a leakage inductance. An energy generated from the leakage inductance is stored in the capacitor.

In one embodiment, the energy-releasing unit includes a DC step-down converter. The DC step-down converter includes an input side. The input side detects the clamping voltage.

In one embodiment, the DC step-down converter converts the clamping voltage into the output voltage according to the clamping voltage.

In one embodiment, when the DC step-down converter detects that the clamping voltage is greater than a setting voltage, the DC step-down converter releases the energy stored in the capacitor to the output capacitor so as to reduce the clamping voltage.

In one embodiment, the DC step-down converter is a switched converter or a low-dropout regulator. The energy-releasing unit further includes a first resistor and a second resistor. The second resistor is coupled to the first resistor in series. The first resistor and the second resistor are connected to the input side of the switched converter or the input side of the low-dropout regulator. The clamping voltage at a series-connected path formed by the first resistor and the second resistor is a first voltage. A divided voltage of the clamping voltage at the second resistor is a second voltage.

In one embodiment, the switched converter or the low-dropout regulator receives the first voltage or the second voltage. The switched converter or the low-dropout regulator converts the clamping voltage into the output voltage according to the first voltage and the second voltage.

In one embodiment, when the switched converter or the low-dropout regulator detects that the first voltage is greater than a first setting voltage or the second voltage is greater than a second setting voltage, the switched converter or the low-dropout regulator releases the energy stored in the capacitor to the output capacitor so as to reduce the clamping voltage.

In one embodiment, the first switch arm comprises a first switch and a second switch coupled in series, and the first switch and the second switch are coupled to a first end of the primary-side winding; the second switch arm comprises a third switch and a fourth switch coupled in series, and the third switch and the fourth switch are coupled to a second end of the primary-side winding.

Accordingly, the present disclosure has the following features and advantages: when the surge voltage is greater than the preset setting voltage, the energy stored in the capacitor can be released to the output capacitor through the DC step-down converter (including but not limited to, the switched converter or the low-dropout regulator) to avoid the continuous and massive accumulation of energy generated by the surge voltage in the capacitor, thereby reducing the clamping voltage. Therefore, the generated surge voltage can be suppressed by means of energy release, and it is not necessary to select components with higher voltage ratings so that the surge voltage can still be suppressed, and the power conversion efficiency of the circuit can be maintained.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
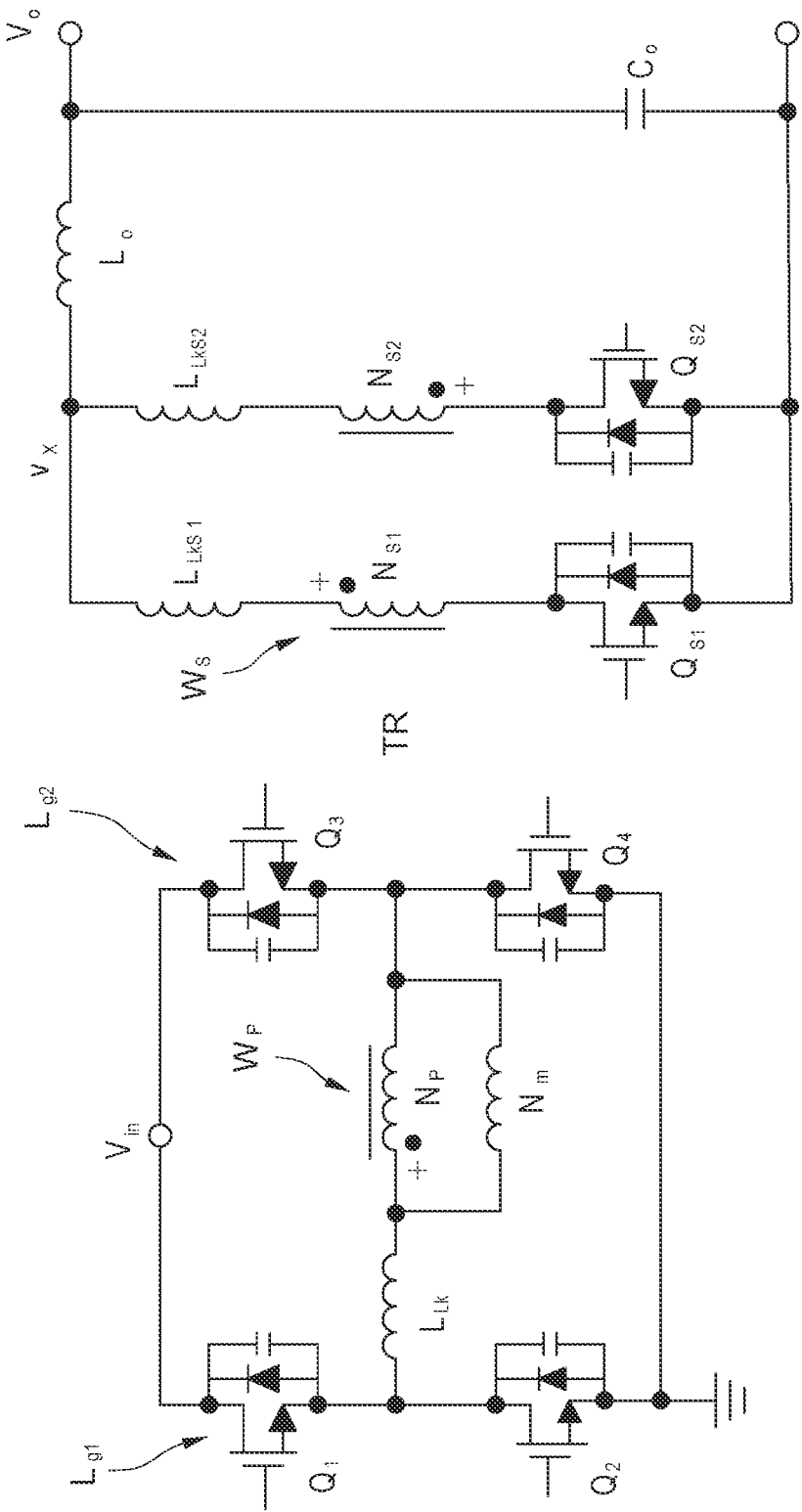
FIG. 1 is a circuit diagram of a full-bridge phase-shift converter in the related art.
Figure 2:
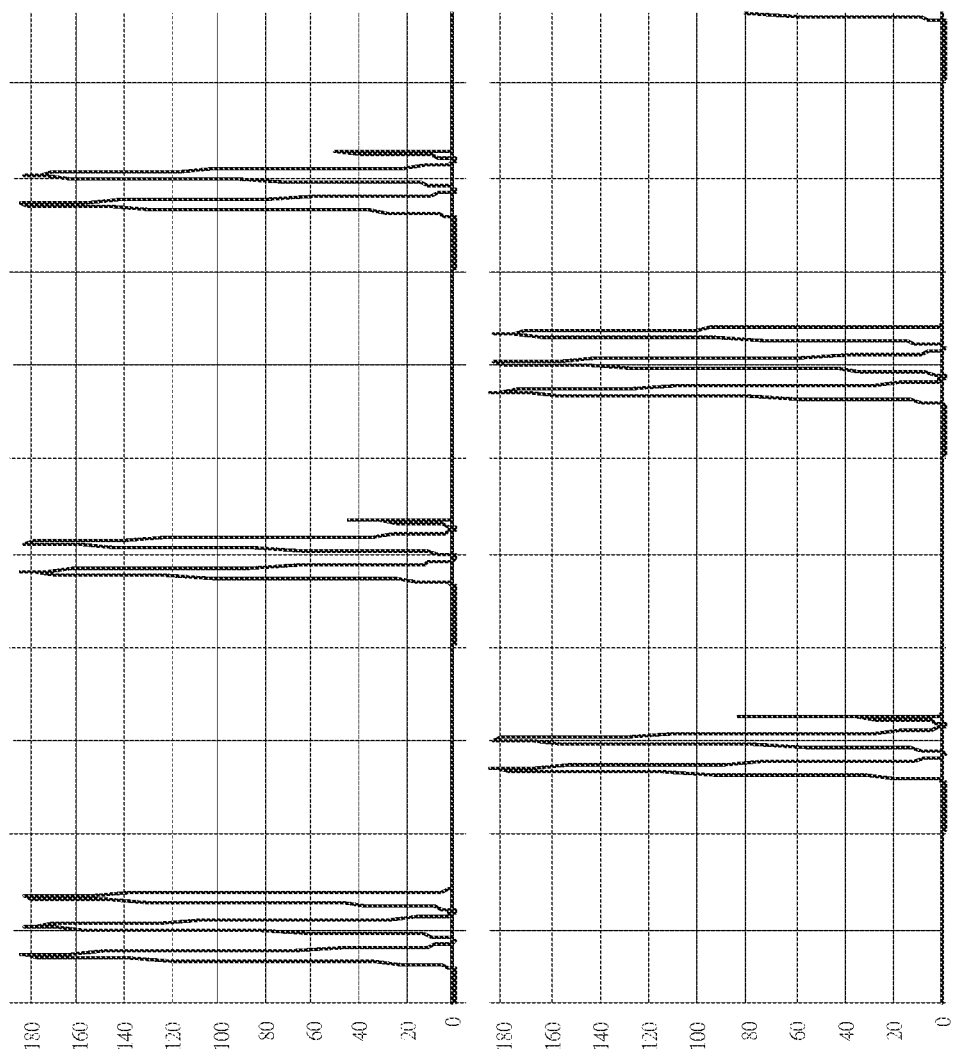
FIG. 2 is a schematic waveform of switch voltages of the full-bridge phase-shift converter in the related art.

Reference will now be made to the drawing figures to describe the present disclosure in detail. It will be understood that the drawing figures and exemplified embodiments of present disclosure are not limited to the details thereof.

Figure 3:
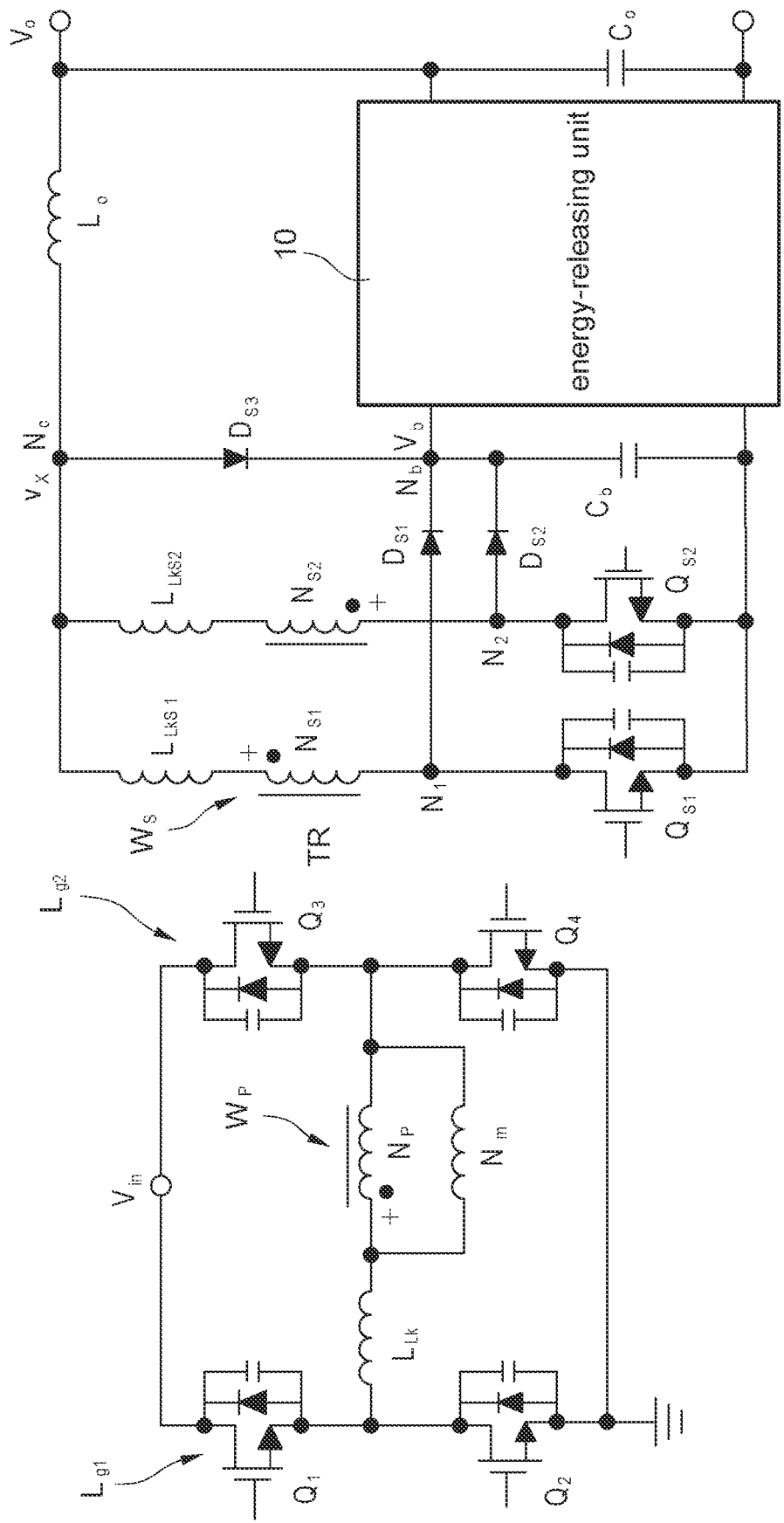
FIG. 3 is a block circuit diagram of a full-bridge phase-shift converter with voltage clamping according to the present disclosure.

Please refer to FIG. 3, which shows a block circuit diagram of a full-bridge phase-shift converter with voltage clamping according to the present disclosure. The full-bridge phase-shift converter with voltage clamping includes a transformer TR, a primary-side circuit, and a secondary-side circuit.

The transformer TR includes a primary-side winding Wp and a secondary-side winding Ws. The primary-side circuit includes a first switch arm Lg1 and a second switch arm Lg2 connected in parallel. The first switch arm Lg1 includes a first switch $Q_1$ and a second switch $Q_2$ connected in series, and the first switch $Q_1$ and the second switch $Q_2$ are coupled to a first end (i.e., a dotted end shown in FIG. 3) of the primary-side winding Wp. The second switch arm Lg2 includes a third switch $Q_3$ and a fourth switch $Q_4$ connected in series, and the third switch $Q_3$ and the fourth switch $Q_4$ are coupled to a second end (i.e., a non-dotted end shown in FIG. 3) of the primary-side winding Wp.

The secondary-side circuit includes a first synchronous rectifying switch $Q_{S1}$, a second synchronous rectifying switch $Q_{S2}$, an output inductor $L_O$, a first diode $D_{S1}$, a second diode $D_{S2}$, a third diode $D_{S3}$, a capacitor $C_b$, an energy-releasing unit 10, and an output capacitor $C_O$.

The secondary-side winding Ws has secondary-side inductances $N_{s1}$, $N_{s2}$ with leakage inductances $L_{LkS1}$, $L_{LkS2}$ (i.e., secondary-side leakage inductances). As shown in FIG. 3, the leakage inductances $L_{LkS1}$, $L_{LkS2}$ are schematically connected to the secondary-side inductances $N_{s1}$, $N_{s2}$, that is, the leakage inductance $L_{LkS1}$ is connected to the secondary-side inductance $N_{s1}$ and the leakage inductance $L_{LkS2}$ is connected to the secondary-side inductance $N_{s2}$.

The first synchronous rectifying switch $Q_{S1}$ is coupled to a first end $N_1$ of the secondary-side winding Ws (i.e., coupled to the secondary-side inductances $N_{s1}$). The second synchronous rectifying switch $Q_{S2}$ is coupled to a second end $N_2$ of the secondary-side winding Ws (i.e., coupled to the secondary-side inductances $N_{s2}$). The output inductor $L_O$ is coupled to a center-tap end $N_C$ of the secondary-side winding Ws. An anode of the first diode $D_{S1}$ is coupled to the first end $N_1$. An anode of the second diode $D_{S2}$ is coupled to the second end $N_2$. An anode of the third diode $D_{S3}$ is coupled to the center-tap end $N_C$. A cathode of the first diode $D_{S1}$, a cathode of the second diode $D_{S2}$, and a cathode of the third diode $D_{S3}$ are commonly coupled to a clamping node $N_b$.

The capacitor $C_b$ is coupled to the clamping node $N_b$, and provides a clamping voltage $V_b$. The energy generated from the leakage inductances $L_{LkS1}$, $L_{LkS2}$ of the secondary-side winding Ws is stored in the capacitor $C_b$. The energy-releasing unit 10 has an input side, and the input side is connected to the capacitor $C_b$ in parallel. The input side detects the clamping voltage $V_b$ of the clamping node $N_b$, and the energy-releasing unit 10 converts the clamping voltage $V_b$ into an output voltage $V_O$. The output capacitor $C_O$ is connected to the energy-releasing unit 10 in parallel, and provides the output voltage $V_O$.

Figure 4:
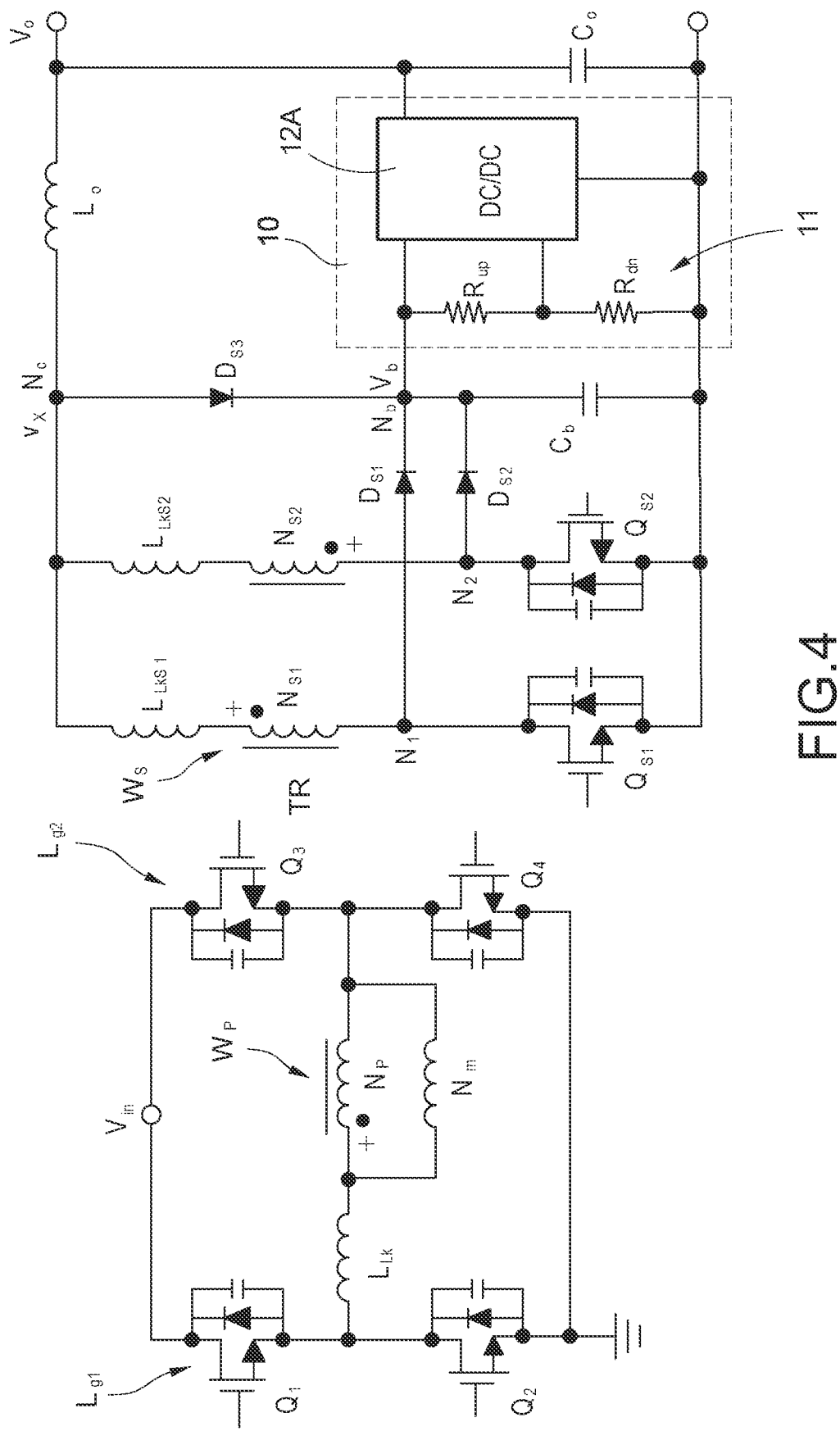
FIG. 4 is a block circuit diagram of an energy-releasing unit according to a first embodiment of the present disclosure.

Please refer to FIG. 4, which shows a block circuit diagram of an energy-releasing unit according to a first embodiment of the present disclosure. Specifically, the energy-releasing unit 10 includes a first resistor $R_{up}$, a second resistor $R_{dn}$, and a DC step-down converter. In this embodiment, the DC step-down converter is a switched converter 12A. The second resistor $R_{dn}$ is connected to the first resistor $R_{up}$ in series. The switched converter 12A is connected to the first resistor $R_{up}$ and the second resistor $R_{dn}$. The clamping voltage $V_b$ at a series-connected path formed by the first resistor $R_{up}$ and the second resistor $R_{dn}$ is a first voltage, that is, the first voltage is a voltage across between the series-connected path formed by the first resistor $R_{up}$ and the second resistor $R_{dn}$. A divided voltage of the clamping voltage $V_b$ at the second resistor $R_{dn}$ is a second voltage, that is, the second voltage is a voltage across the second resistor $R_{dn}$. Incidentally, in different embodiments, the first resistor $R_{up}$ and the second resistor $R_{dn}$ may be also integrated and designed inside the switched converter 12A, which can also achieve the operations of voltage detection and voltage division of the clamping voltage $V_b$. Moreover, since the main purpose of the first resistor $R_{up}$ and the second resistor $R_{dn}$ is the voltage detection and the voltage division, in the present disclosure, resistance values of the first resistor $R_{up}$ and the second resistor $R_{dn}$ are designed to be large so that the current flowing through the first resistor $R_{up}$ and the second resistor $R_{dn}$ is made so small that losses are negligible.

Specifically, the switched converter 12A receives the first voltage or the second voltage. The switched converter 12A converts (for example, steps down) the clamping voltage $V_b$ into the output voltage $V_O$ according to the first voltage and the second voltage. When the switched converter 12A detects that the first voltage is greater than a first setting voltage or the second voltage is greater than a second setting voltage, the switched converter 12A releases the energy stored in the capacitor $C_b$ to the output capacitor $C_O$ so as to reduce the clamping voltage $V_b$. For example, the first setting voltage may be set to 90 volts. When the first synchronous rectifying switch $Q_{S1}$ or the second synchronous rectifying switch $Q_{S2}$ is turned off, the leakage inductance $L_{LkS1}$ or the leakage inductance $L_{LkS2}$ and parasitic capacitances of the first synchronous rectifying switch $Q_{S1}$ or the second synchronous rectifying switch $Q_{S2}$ occur oscillation to generate surge voltages (i.e., the clamping voltage $V_b$ formed at the clamping node $N_b$ is the first voltage) and the surge voltage is greater than the first setting voltage (90 volts), the switched converter 12A releases the energy stored in the capacitor $C_b$ to the output capacitor $C_O$ to avoid the continuous and massive accumulation of energy generated by the surge voltage in the capacitor $C_b$, thereby reducing the clamping voltage $V_b$. Therefore, the generated surge voltage can be suppressed by means of energy release, and it is not necessary to select components with higher voltage ratings so that the surge voltage can still be suppressed, and the power conversion efficiency of the circuit can be maintained.

Alternatively, the second setting voltage may be set to 30 volts. When the first synchronous rectifying switch $Q_{S1}$ or the second synchronous rectifying switch $Q_{S2}$ is turned off, the leakage inductance $L_{LkS1}$ or the leakage inductance $L_{LkS2}$ and parasitic capacitances of the first synchronous rectifying switch $Q_{S1}$ or the second synchronous rectifying switch $Q_{S2}$ occur oscillation to generate surge voltages (i.e., the clamping voltage $V_b$ is divided into the second voltage based on resistance designs of the first resistor $R_{up}$ and the second resistor $R_{dn}$) and the surge voltage is greater than the second setting voltage (30 volts), the switched converter 12A releases the energy stored in the capacitor $C_b$ to the output capacitor $C_O$ to avoid the continuous and massive accumulation of energy generated by the surge voltage in the capacitor $C_b$, thereby reducing the clamping voltage $V_b$. Therefore, the generated surge voltage can be suppressed by means of energy release, and it is not necessary to select components with higher voltage ratings so that the surge voltage can still be suppressed, and the power conversion efficiency of the circuit can be maintained.

Figure 6:
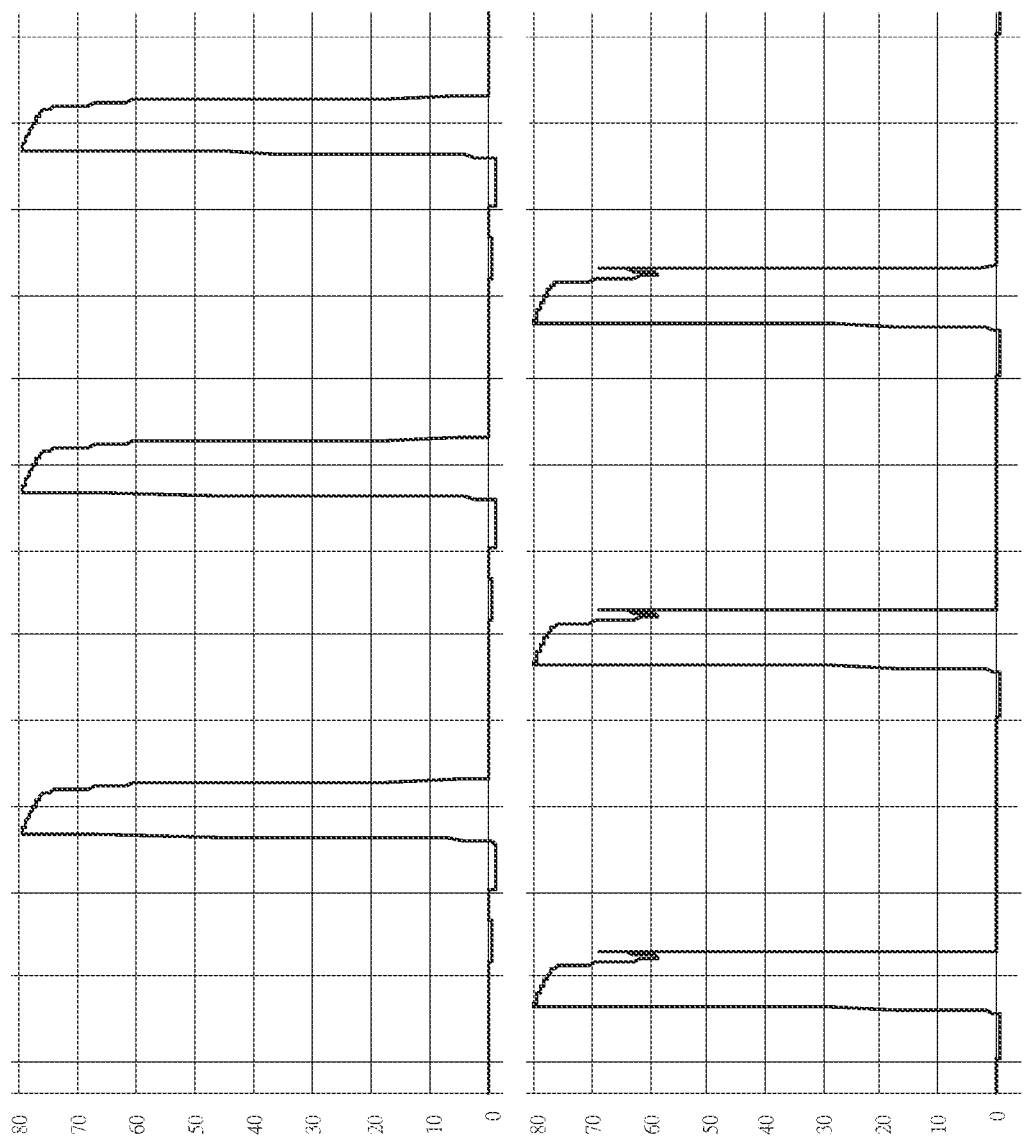
FIG. 6 is a schematic waveform of switch voltages of the full-bridge phase-shift converter with voltage clamping according to the present disclosure.

Please refer to FIG. 6, which shows a schematic waveform of switch voltages of the full-bridge phase-shift converter with voltage clamping according to the present disclosure. Therefore, the maximum voltage peak value of the switch voltage waveform can be suppressed below 80 volts, which is not only lower than the rated value of the component, but also prevents the generation of electromagnetic interference (EMI) noise.

Figure 5:
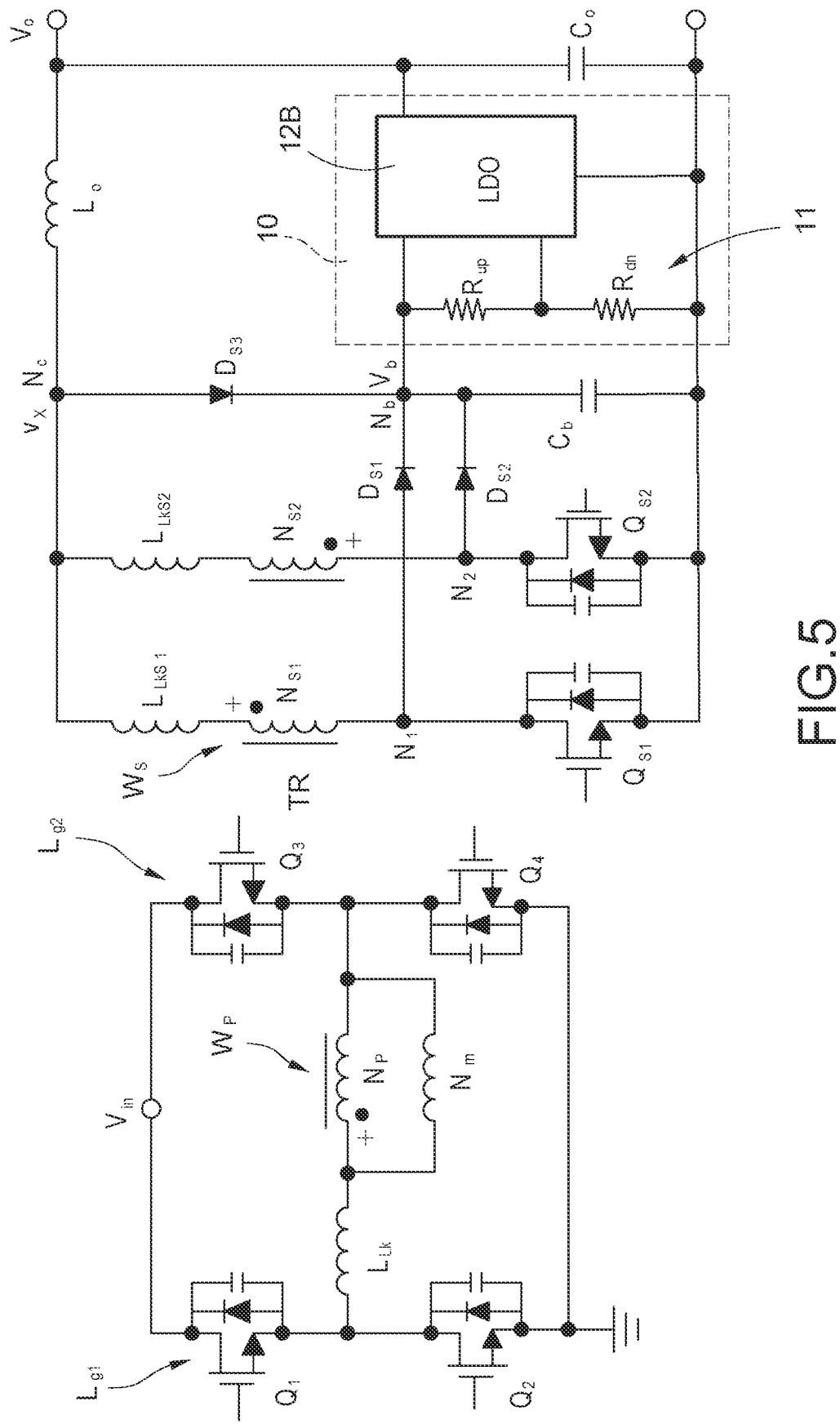
FIG. 5 is a block circuit diagram of the energy-releasing unit according to a second embodiment of the present disclosure.

Please refer to FIG. 5, which shows a block circuit diagram of the energy-releasing unit according to a second embodiment of the present disclosure. Specifically, the energy-releasing unit 10 includes a first resistor $R_{up}$, a second resistor $R_{dn}$, and a DC step-down converter. In this embodiment, the DC step-down converter is a low-dropout regulator (LDO) 12B. The second resistor $R_{dn}$ is connected to the first resistor $R_{up}$ in series. The low-dropout regulator 12B is connected to the first resistor $R_{up}$ and the second resistor $R_{dn}$. The clamping voltage $V_b$ at a series-connected path formed by the first resistor $R_{up}$ and the second resistor $R_{dn}$ is a first voltage, that is, the first voltage is a voltage across between the series-connected path formed by the first resistor $R_{up}$ and the second resistor $R_{dn}$. A divided voltage of the clamping voltage $V_b$ at the second resistor $R_{dn}$ is a second voltage, that is, the second voltage is a voltage across the second resistor $R_{dn}$.

Incidentally, in different embodiments, the first resistor $R_{up}$ and the second resistor $R_{dn}$ may be also integrated and designed inside the low-dropout regulator 12B, which can also achieve the operations of voltage detection and voltage division of the clamping voltage $V_b$. Moreover, since the main purpose of the first resistor $R_{up}$ and the second resistor $R_{dn}$ is the voltage detection and the voltage division, in the present disclosure, resistance values of the first resistor $R_{up}$ and the second resistor $R_{dn}$ are designed to be large so that the current flowing through the first resistor $R_{up}$ and the second resistor $R_{dn}$ is made so small that losses are negligible.

Specifically, the low-dropout regulator 12B receives the first voltage or the second voltage. The low-dropout regulator 12B converts (for example, steps down) the clamping voltage $V_b$ into the output voltage $V_O$ according to the first voltage and the second voltage. When the low-dropout regulator 12B detects that the first voltage is greater than a first setting voltage or the second voltage is greater than a second setting voltage, the low-dropout regulator 12B releases the energy stored in the capacitor $C_b$ to the output capacitor $C_O$ so as to reduce the clamping voltage $V_b$. For example, the first setting voltage may be set to 90 volts. When the first synchronous rectifying switch $Q_{S1}$ or the second synchronous rectifying switch $Q_{S2}$ is turned off, the leakage inductance $L_{LkS1}$ or the leakage inductance $L_{LkS2}$ and parasitic capacitances of the first synchronous rectifying switch $Q_{S1}$ or the second synchronous rectifying switch $Q_{S2}$ occur oscillation to generate surge voltages (i.e., the clamping voltage $V_b$ formed at the clamping node $N_b$ is the first voltage) and the surge voltage is greater than the first setting voltage (90 volts), the low-dropout regulator 12B releases the energy stored in the capacitor $C_b$ to the output capacitor $C_O$ to avoid the continuous and massive accumulation of energy generated by the surge voltage in the capacitor $C_b$, thereby reducing the clamping voltage $V_b$. Therefore, the generated surge voltage can be suppressed by means of energy release, and it is not necessary to select components with higher voltage ratings so that the surge voltage can still be suppressed, and the power conversion efficiency of the circuit can be maintained.

Alternatively, the second setting voltage may be set to 30 volts. When the first synchronous rectifying switch $Q_{S1}$ or the second synchronous rectifying switch $Q_{S2}$ is turned off, the leakage inductance $L_{LkS1}$ or the leakage inductance $L_{LkS2}$ and parasitic capacitances of the first synchronous rectifying switch $Q_{S1}$ or the second synchronous rectifying switch $Q_{S2}$ occur oscillation to generate surge voltages (i.e., the clamping voltage $V_b$ is divided into the second voltage based on resistance designs of the first resistor $R_{up}$ and the second resistor $R_{dn}$) and the surge voltage is greater than the second setting voltage (30 volts), the low-dropout regulator 12B releases the energy stored in the capacitor $C_b$ to the output capacitor $C_O$ to avoid the continuous and massive accumulation of energy generated by the surge voltage in the capacitor $C_b$, thereby reducing the clamping voltage $V_b$. Therefore, the generated surge voltage can be suppressed by means of energy release, and it is not necessary to select components with higher voltage ratings so that the surge voltage can still be suppressed, and the power conversion efficiency of the circuit can be maintained.

In summary, the present disclosure has the following features and advantages: when the surge voltage is greater than the preset setting voltage, the energy stored in the capacitor $C_b$ can be released to the output capacitor $C_O$ through the DC step-down converter (including but not limited to, the switched converter 12A or the low-dropout regulator 12B) to avoid the continuous and massive accumulation of energy generated by the surge voltage in the capacitor $C_b$, thereby reducing the clamping voltage $V_b$. Therefore, the generated surge voltage can be suppressed by means of energy release, and it is not necessary to select components with higher voltage ratings so that the surge voltage can still be suppressed, and the power conversion efficiency of the circuit can be maintained.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A full-bridge phase-shift converter with voltage clamping, comprising:
    a transformer, comprising a primary-side winding and a secondary-side winding comprising a leakage inductance,
    a primary-side circuit, comprising:
        a first switch arm, and
        a second switch arm, coupled to the first switch arm in parallel, and
    a secondary-side circuit, comprising:
        a first synchronous rectifying switch, coupled to a first end of the secondary-side winding,
        a second synchronous rectifying switch, coupled to a second end of the secondary-side winding,
        an output inductor, coupled to a center-tap end of the secondary-side winding,
        a first diode, an anode of the first diode coupled to the first end,
        a second diode, an anode of the second diode coupled to the second end,
        a third diode, an anode of the third diode coupled to the center-tap end, and a cathode of the first diode, a cathode of the second diode, and a cathode of the third diode commonly coupled to a clamping node,
        a capacitor, coupled to the clamping node, and configured to provide a clamping voltage, wherein an energy generated from the leakage inductance is stored in the capacitor,
        an energy-releasing unit, coupled to the capacitor in parallel, and configured to convert the clamping voltage into an output voltage, wherein the energy-releasing unit comprises a DC step-down converter comprising an input side, and the input side is configured to detect the clamping voltage, and
        an output capacitor, coupled to the energy-releasing unit in parallel, and configured to provide the output voltage,
    wherein the DC step-down converter converts the clamping voltage into the output voltage according to the clamping voltage, and
    wherein when the DC step-down converter detects that the clamping voltage is greater than a setting voltage, the DC step-down converter releases the energy stored in the capacitor to the output capacitor so as to reduce the clamping voltage.

2. The full-bridge phase-shift converter as claimed in claim 1, wherein the first switch arm comprises a first switch and a second switch coupled in series, and the first switch and the second switch are coupled to a first end of the primary-side winding; the second switch arm comprises a third switch and a fourth switch coupled in series, and the third switch and the fourth switch are coupled to a second end of the primary-side winding.

3. A full-bridge phase-shift converter with voltage clamping, comprising:
    a transformer, comprising a primary-side winding and a secondary-side winding comprising a leakage inductance,
    a primary-side circuit, comprising:
        a first switch arm, and
        a second switch arm, coupled to the first switch arm in parallel, and
    a secondary-side circuit, comprising:
        a first synchronous rectifying switch, coupled to a first end of the secondary-side winding,
        a second synchronous rectifying switch, coupled to a second end of the secondary-side winding,
        an output inductor, coupled to a center-tap end of the secondary-side winding,
        a first diode, an anode of the first diode coupled to the first end,
        a second diode, an anode of the second diode coupled to the second end,
        a third diode, an anode of the third diode coupled to the center-tap end, and a cathode of the first diode, a cathode of the second diode, and a cathode of the third diode commonly coupled to a clamping node,
        a capacitor, coupled to the clamping node, and configured to provide a clamping voltage, wherein an energy generated from the leakage inductance is stored in the capacitor,
        an energy-releasing unit, coupled to the capacitor in parallel, and configured to convert the clamping voltage into an output voltage, wherein the energy-releasing unit comprises a DC step-down converter comprising an input side, and the input side is configured to detect the clamping voltage, and
        an output capacitor, coupled to the energy-releasing unit in parallel, and configured to provide the output voltage, wherein the DC step-down converter is a switched converter or a low-dropout regulator, and the energy-releasing unit further comprises a first resistor and a second resistor coupled in series, wherein the first resistor and the second resistor are connected to the input side of the switched converter or the input side of the low-dropout regulator, wherein the clamping voltage at a series-connected path formed by the first resistor and the second resistor is a first voltage; a divided voltage of the clamping voltage at the second resistor is a second voltage, wherein the switched converter or the low-dropout regulator receives the first voltage or the second voltage, and wherein the switched converter or the low-dropout regulator converts the clamping voltage into the output voltage according to the first voltage and the second voltage.

4. The full-bridge phase-shift converter as claimed in claim 3, wherein when the switched converter or the low-dropout regulator detects that the first voltage is greater than a first setting voltage or the second voltage is greater than a second setting voltage, the switched converter or the low-dropout regulator releases the energy stored in the capacitor to the output capacitor so as to reduce the clamping voltage.

* * * * *